United States Patent [19]

Engelsman

[11] Patent Number: 4,958,141

[45] Date of Patent: Sep. 18, 1990

[54] REAL TIME RANK ORDERING LOGIC CIRCUIT

[75] Inventor: Ronald L. Engelsman, Anaheim, Calif.

[73] Assignee: Hughes Aircraft Company, Los Angeles, Calif.

[21] Appl. No.: 220,138

[22] Filed: Jul. 15, 1988

[51] Int. Cl.$^5$ ............................................. G06F 7/02
[52] U.S. Cl. ............................. 340/146.2; 364/715.01
[58] Field of Search ...................... 340/146.2; 364/200, 364/900, 715.01

[56] References Cited

U.S. PATENT DOCUMENTS

| | | | |
|---|---|---|---|
| 3,829,664 | 8/1974 | Kashio | 340/146.2 X |
| 3,848,586 | 11/1974 | Suzuki et al. | 340/146.2 X |
| 3,927,391 | 12/1975 | Cantrell | 340/146.2 |
| 4,119,946 | 10/1978 | Taylor | 382/34 |
| 4,255,740 | 3/1981 | Ferrie | 340/146.2 |
| 4,628,483 | 12/1986 | Nelson | 340/900 |
| 4,649,394 | 3/1987 | Minker et al. | 342/94 |

FOREIGN PATENT DOCUMENTS 0036751 9/1981 European Pat. Off. .

OTHER PUBLICATIONS

1985 International Symposium on Circuits & Systems, 5-7 June 1985, Kyoto (JP), vol. 3 IEEE; N. Kanpopoulos et al.; "On the Architecture of a Monolithic Median Filter with Variable Window Widths", pp. 1537-1538.

Systems & Computers in Japan, vol. 17, No. 1, Jan. 1986, Scripta Technica, Inc. (New York, US), T. Nakayama et al.; "An Algorithm to Perform the Rank Filter and its Application", pp. 19-25.

Primary Examiner—Gary V. Harkcom
Assistant Examiner—Tan V. Mai
Attorney, Agent, or Firm—Wanda K. Denson-Low

[57] ABSTRACT

A ranking circuit operable in real time to rank a set of periodically changing sample values, having a series of sequentially clocked storage registers for sequentially storing the sample values, a series of corresponding first comparators for comparing each sample stored to the incoming sample, a summer for summing the outputs of the first comparators to assign an initial rank to the incoming sample, a series of rank registers for storing the initial rank value and a rank value corresponding to each sample in the sample registers, increment/decrement logic for adjusting each rank in the respective rank registers as each new sample is received, logic for effectively excluding a target sample from the ranking process, and logic for outputting a sample value of selected rank during each clock cycle. Optional logic for automatically adjusting the selected rank based on the relative amplitudes of the samples being ranked is also disclosed.

22 Claims, 4 Drawing Sheets

REAL TIME RANK ORDERING LOGIC CIRCUIT

BACKGROUND OF THE INVENTION

1. Field of the Invention

The subject invention relates to circuitry for rank ordering a set of numbers, and particularly to such a circuit having the capability to adjust rank in a single clock cycle, while eliminating the effect of a sample or test cell on the number ranking and providing a sample having a particular selected rank as an output. The circuit is particularly applicable to radars which employ ordered statistic (OS) constant false alarm rate (CFAR) detection circuits, but has broad applications in many other number ranking contexts.

2. Brief Description of Related Art

A new method of computing thresholds for a radar detector is described in "Radar CFAR Thresholding in Clutter and Multiple Target Situations" by Herman Rohling in IEEE Transactions on Aerospace and Electronic Systems, Vol. AES-19, No. 4, July 1983. This method offers several important advantages over presently-used CFAR methods. Such methods use a CFAR circuit which computes a mean level based on the arithmetic average of the video in the area around the sample of interest. As explained by Rohling, this cell averaging method does not perform well in the presence of clutter or multiple targets. An Ordered Statistic (OS) CFAR can provide performance which is nearly equal to the cell average method when in a noise only environment, and it provides improved performance when operating in an environment containing clutter and/or multiple targets.

An OS CFAR Detector performs the following functions:

1. Inputs all video samples within N/2 samples on either side of the sample cell which is being examined for the presence or absence of a Target.
2. Examines the amplitude of the N samples and assigns each of them a rank according to relative amplitude. This is analogous to sorting N different numbers in order by the values of the numbers.
3. Selects the sample which has a Predetermined Rank (RT) from the sample set. The amplitude of this sample is used as a basis for setting the Target Detection Threshold.
4. Determines the number of samples (Nc) which exceeds the average noise level by a predetermined amount. When this number exceeds certain predetermined values the circuit will adjust RT to prevent an increase of the false alarm rate in severe clutter. As RT changes the circuit automatically adjusts the detection Threshold offset (TD) to maintain the desired probability of false alarm.

All of the above functions must be performed for each video sample point and in a parallel fashion such that the detection function can take place in real time at a rate that matches the video bandwidth.

As may be appreciated, an essential feature of an OS CFAR detector is the ability to rank order a set of numbers. Prior methods used for rank ordering a set of numbers involved algorithms implemented on programmable computers. These algorithms require multiple passes through the sample set. Each pass requires the moving of data among locations in memory and comparing operations in an arithmetic logic unit (ALU).

The disadvantage of these prior techniques is that they are extremely slow compared to the subject invention.

It may further be seen that in the OS CFAR application, the sample cell or test cell is excluded from the ranking process U.S. Pat. No. 4,649,394 to Minker and Rohling discloses an OS CFAR radar in which rank ordering is proposed, but does not disclose circuitry capable of rank ordering the number set while excluding the sample or test cell from the ranking process. Such capability is also lacking in other number ranking circuits, for example, as disclosed in U.S. Pat. No. 3,927,391. The circuitry of that patent further does not output or select a particular value, but rather outputs only the rank of each member in a set of numbers. Also, according to the '391 patent, if two samples have the same value, they are given identical rank, which precludes the circuit from outputting a single member of a particular rank.

SUMMARY OF THE INVENTION

It is therefore an object of the invention to provide improved circuitry for rank ordering numbers;

It is another object of the invention to provide a rank ordering circuit which can rank sample values about a sample cell or test cell, while eliminating the effect of the sample or test cell on the ranking process;

It is another object of the invention to provide a number ranking circuit which can be used to practically implement an OS CFAR detector circuit in radar;

It is another object of the invention to provide a rank ordering circuit which outputs a sample value of selected rank;

It is another object of the invention to provide improved digital number ranking circuitry which receives a new number in a set to be ranked each clock cycle and recomputes the ranking of the samples in the set during the same clock cycle; and It is another object of the invention to provide such a digital number ranking circuit with the capability to output a member of the set having any particular rank during any one clock cycle.

According to the invention, storage circuitry is provided to store incoming video samples and comparison circuitry is provided to compare the magnitude of each of the stored samples to the magnitude of the incoming sample to produce a series of outputs. The outputs are summed to determine an initial rank for the incoming sample. This initial rank and a rank value for each other sample are stored. As each new sample is received, increment/decrement circuitry adjusts the value of the stored rank values. The circuitry further provides means for effectively eliminating the effect of a target or test sample on the ranking process, as well as circuitry for outputting a sample of selected rank.

The preferred embodiment is a digital logic circuit which recomputes the rank order of a set of numbers in a single clock cycle. Each clock cycle, one new number is entered into the set and one number previously in the set is removed. The circuit also finds and outputs any particular ranked member of the set on each clock cycle. The operation of this circuit is analogous to sorting a set of N numbers in order by magnitude and then selecting the $m^{th}$ member of the set. The sorting and selecting is performed each clock cycle with one member of the set replaced by a new member.

The subject invention provides circuitry which performs the required computations at the speed required for radar applications with about the same amount of circuitry as is used for current CFAR methods. Therefore, this invention makes it practical to implement an OS CFAR detector in typical special purpose computers or signal processors.

The invention may find application in any products which require the high speed processing of data by dedicated special purpose hardware. Some examples are radar, sonar and video image signal processors.

BRIEF DESCRIPTION OF THE DRAWINGS

The just-summarized invention will now be described in detail in conjunction with the drawings, of which.

DETAILED DESCRIPTION OF THE PREFERRED EMBODIMENTS

Figure 1:
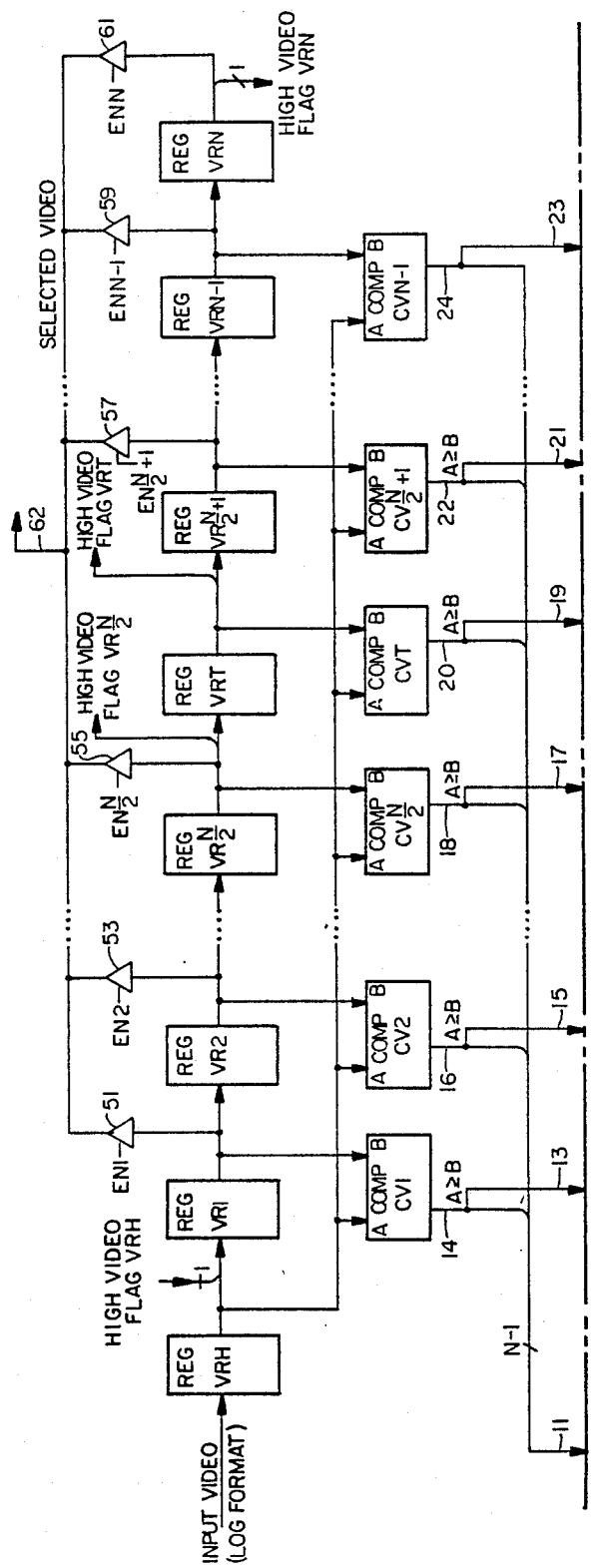
FIG. 1 is a circuit diagram illustrating the preferred embodiment.

FIG. 1 discloses the preferred embodiment, which includes logic which ranks all samples in a selected window and selects one sample from the window having a particular rank. In FIG. 1, video samples in log format enter the circuit and are sequentially stored in a first register VRH. These samples are then clocked serially through the pipeline of serially-connected video registers VR1, VR2 ... VR N/2, VRT, VR N/2+1 .. . VRN−1, VRN. A new sample held in the first register VRH is compared to each of the samples already in the pipeline by a first set of N comparators CV1, CV2, ... CV N/2, CVT, CV N/2+1 ... CVN−1. Each of these N comparators CV1 ... CVN−1 receives VRH as its A input and the output of a respective video sample register VR1 ... VRN as its B input. Each of the N comparators CV1 ... CVN−1 tests whether the new sample in VRH is equal to or greater than the sample in the associated video sample register VR1 ... VRN and produces an output in such case on output lines 14, 16, 18, 20, 22, 24.

Figure 2:
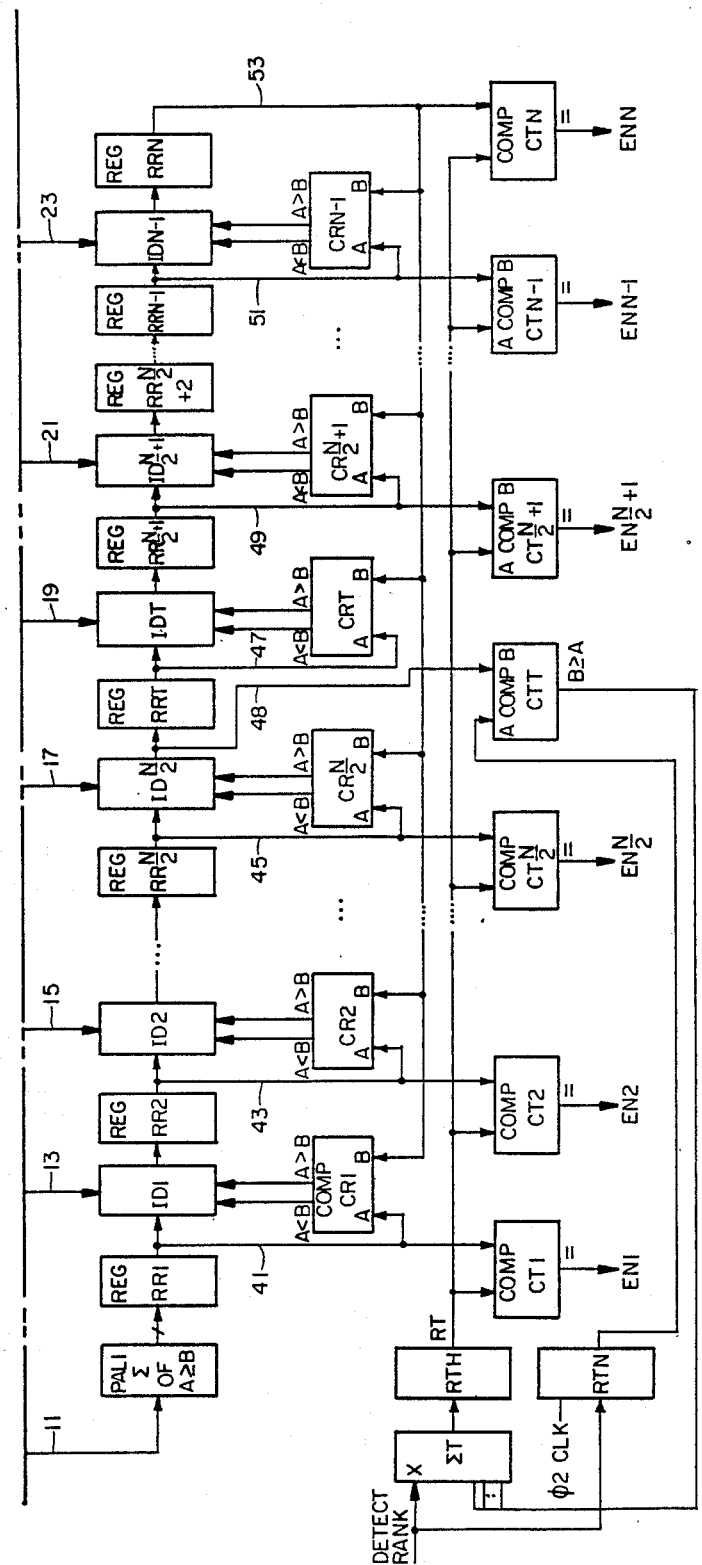
FIG. 2 is a continuation of the circuit of FIG. 1.

A bus represented by line 11 supplies each of the outputs 14, 16, 18, 20, 24, 26 to a summer PAL 1 shown in FIG. 2. The summer PAL 1 sums the outputs of the first comparators CV1 ... CVN−1 and encodes the sum into a binary word which is loaded into a first rank register RR1. The contents of the rank register RR1 then will always contain the rank of the data in register VR1. For example, if ten "CV" comparators output a "one," the adder PAL outputs "ten" in binary, which indicates that the new number in the input video sample register VRH ranks tenth. If the value in the register VRH is the smallest in rank, no one's will be outputted by the "CV" comparators and the PAL adder output will be zero. In general, the largest value in the pipeline will have a rank of N-1 and the smallest value in the pipeline will have a rank of zero. The rank words themselves contain $LOG_2 (N-1)$ bits.

The rank registers RR1, RR2, ... RR N/2, RRT, RR N/2+1 ... RRN−1, RRN form a pipeline parallel to the pipeline of registers VR1 ... VRN. Each register RR(n) is associated with a corresponding register VR(n) and contains the rank of the contents of VR(n). All pipeline registers VR(n) and RR(n) are clocked on the same clock edge.

Between each pair of the rank registers RR(n) is an increment/decrement ("ID") circuit ID1, ID2, ... ID N/2, IDT, ID N/2+1 ... . IDN−1, each of which increments or Decrements the rank number stored in the preceding rank register RR(n) before it is passed to the next rank register RR(n+1). Each ID circuit receives an input from the output of a respective comparator CV1 ... CVN−1 on a respective input 13, 15, 17, 19, 21, 23, as well as A<B and A>B inputs from a second set of comparators CR1, CR2, CR N/2, ... CRT, CR N/2+1, ... CRN−1. Such incrementing or decrementing capability is required because every new input to the input video register VRH either bumps up, bumps down, or does not change the rank of each other sample.

The comparators CR1 ... CRN−1 each receive the output of the last rank register RRN as one input and the output of a respective rank register RR1 ... RRN−1 on lines 41, 43, 45, 47, 49, 51 as a second input. They compare RRN, the value of the sample exiting the sample set, to the contents of each rank register RR1 .. . RRN−1 for each sample remaining in the sample set.

Figure 3:
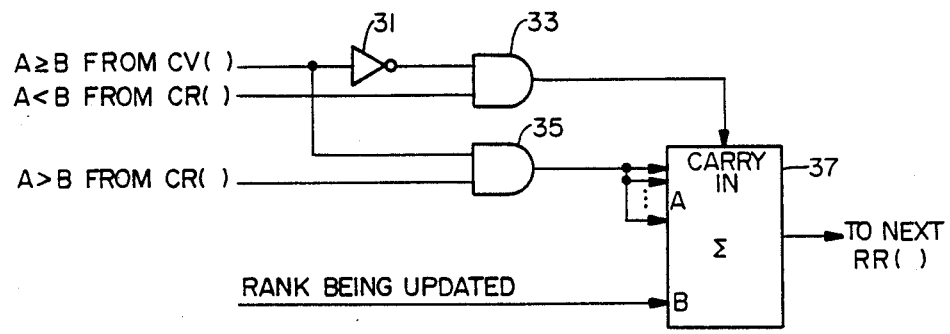
FIG. 3 is a circuit diagram of logic for implementing the I/D blocks of FIG. 1.

The logic in each ID circuit ID1, ID2 ... IDN−1 is shown in FIG. 3. This logic includes an inverter 31, two AND gates 33, 35, and an adder 37. The AND gate 33 receives the inverted input from the associated CV comparator and the A<B input of the associated CR comparator. The second AND gate receives the noninverted CV input and the A>B input of the associated CR comparator. The output of the AND gate 33 is connected to the carry-in input of the adder 37, while the output of the AND gate 35 is connected to each parallel input of the A addend input of the adder 37. The rank being updated a word of $LOG_2 (N-1)$ bits, forms a parallel input to the B addend input of the adder 37. Thus, when the output of the AND gate 35 is a "one," the value one is subtracted from the B input by the adder 37. When the output of the gate 35 is a "zero," the value zero is added to the B input. When a carry is supplied to the adder 37, the value one is added to the B input.

The hold/increment/decrement rules implemented through the ID logic are as follows:

[VRH·VR(n)].[RRN ·RR(n)]→HOLD

[VRH·VR(n)].[RRN <RR(n)]→DECREMENT

[VRH<VR(n)].[RRN >RR(n)]→INCREMENT

[VRH<VR(n)].[RRN ·RR(n)]→HOLD where "HOLD" indicates no change to the rank value being updated. By simultaneously applying these decision rules to each video sample in the pipeline, all rank numbers can be updated during a single clock circle.

The video sample stored in the video register VRT is the sample in the center of the window which is being examined for the presence of a threshold crossing, sometimes referred to as the "test" or "target" sample. The rank of this sample VRT is maintained in the rank register RRT, but it is effectively removed from the sample set being ranked, an important feature of the preferred embodiment. In order to accomplish effective removal, a comparator CTT, two rank detect registers RTH, RTN and an adder ΣT are employed. The output of the ID circuit ID N/2 on a line 48 is compared to the contents of the register RTN by the comparator CTT. The register RTN contains the rank of the sample to be outputted or detected as determined by associated apparatus. The register RTN is clocked on a clock phase ∅

CLK opposite of that which clocks the register RTH such that it contains the "Detect Rank" a half clock interval prior to the update of the register RTH. If the output of the circuit ID N/2 is greater than or equal to the value stored in the register RTN, the output of the comparator CTT causes the adder T to decrement the "Detect Rank" before it is stored in the register RTH. This decremented value of the "Detect Rank" will then cause selection of the proper video register VR(n) to be outputted to the selected video bus, i.e., the same value that would be selected with the test sample removed from the sample set.

The importance of removing VRT from the sample set being ranked may be illustrated by considering a situation where it is desired to output the sample having the seventh largest magnitude. If the test sample has, for example, a rank of eight, the desired sample is actually the sixth largest sample. The foregoing circuitry effectively operates to exclude the test sample and pick the sixth sample in such a situation.

In order to output the appropriate sample, a third set of comparators CT1, CT2, . . . C1 N/2, CT N/2+1 . . . CTN−1, CTN are provided, each of which receives a first input RT from the output of the RTH register and a second input from a respective one of the rank register output lines 41, 43, 45, 49, 51, 53. Each output EN1, EN2 . . . E N/2, EN N/2+1, ENN−1, ENN of these comparators CT1, CT2 . . . CT N/2, CT N/2+1 . . . CTN−1, CTN is supplied as an enable signal to a respective one of a number of tri-state buffers 51, 53, 55, 57, 59, 61, shown in FIG. 1. These comparators CT1 . . . CTN thus compare the modified detect rank RT to each of the sample ranks. The output of one of the comparators CT1 . . . CTN will be active and enable the contents of one of the VR registers onto the tristate "Selected Video" bus through application of the appropriate EN enable signal.

Figure 4:
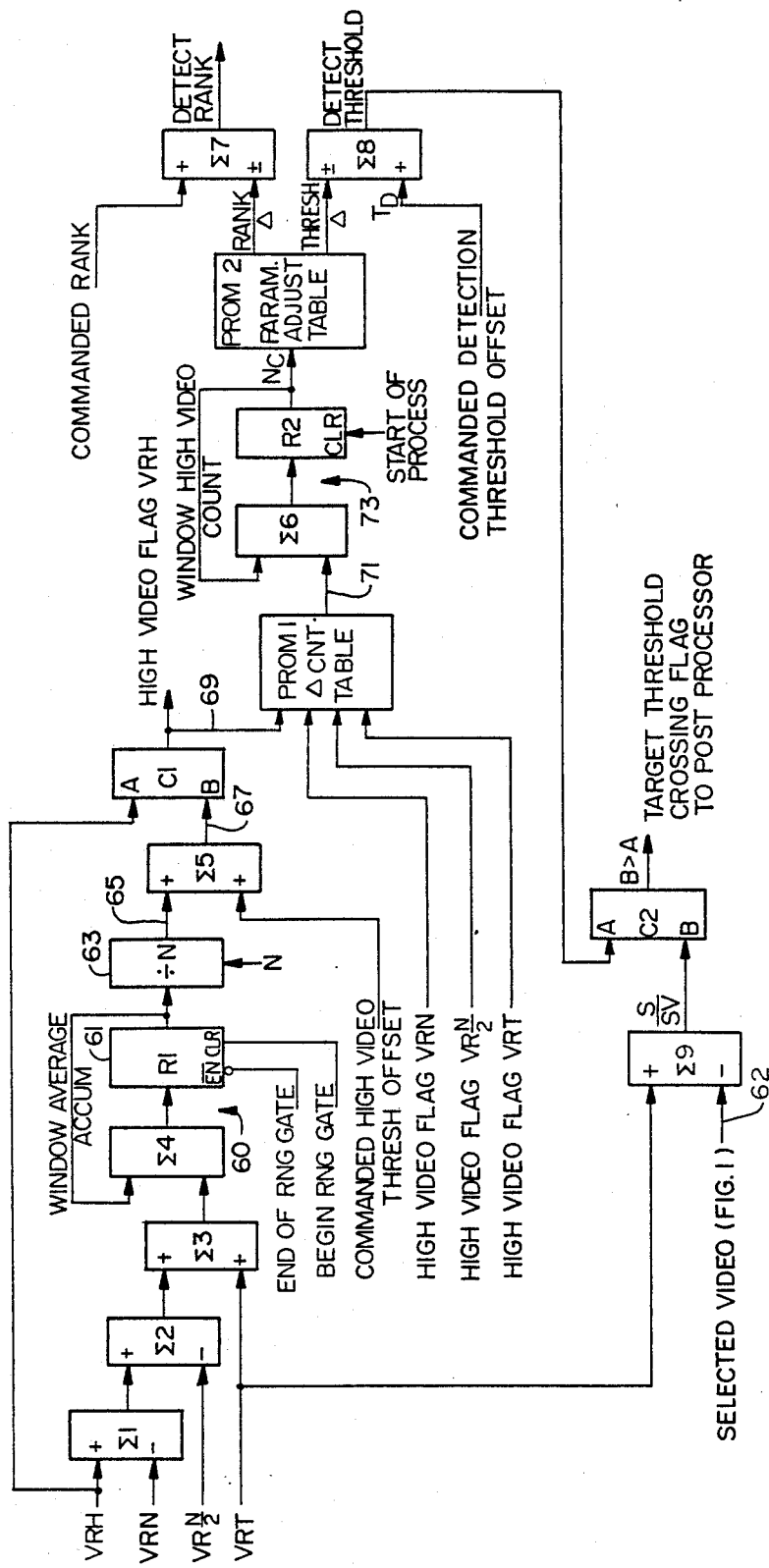
FIG. 4 is a circuit diagram of circuitry useful in a radar application of the preferred embodiment.

Prior to entering the first sample of a new sample set into register VRH, all pipeline registers, VR(n) and RR(n), are cleared to zero. This allows the ranking to self-initialize as the sample set is being filled FIG. 4 discloses circuitry which detects the number of large video samples in the window and automatically adjusts both the rank of the selected sample and the detection threshold offset. The circuit includes an accumulator section which calculates the arithmetic average of the magnitude of all of the samples in the window under examination and sets a threshold based on the average. A second accumulator section then calculates the number of samples whose magnitude exceeds the threshold and adjusts the selected rank based on this calculation. FIG. 4 is particularly suitable for adapting the embodiment of FIG. 1 to radar applications.

In FIG. 4, the adders $\Sigma 1$, $\Sigma 2$ and $\Sigma 3$ receive and algebraically add together the contents of the registers VRH, VRN, VR N/2 and VRT. The contents of the register VRH are entering the window as new data, the contents of VRN are exiting the window. The contents of the register VR N/2 are being removed from the window for one clock interval while being tested for a threshold crossing. The contents of the register VRT are being added back into the window after having been tested for a threshold crossing. The first three adders $\Sigma 1$, $\Sigma 2$, $\Sigma 3$ thus generate a net sum of all values entering and leaving the window during each clock interval.

A fourth adder $\Sigma 4$ receives this net sum output of the third adder $\Sigma 3$ and supplies an output to a register R1, whose output is fed back to a first input of the fourth adder $\Sigma 4$. A divider 63 receives the output of the fourth summer $\Sigma 4$ and divides it by N. The fourth adder $\Sigma 4$ and register R1 form a conventional sliding window accumulator denoted 60. The divider 63 normalizes the contents of the accumulator 60 and provides an output 65, which is an average video amplitude.

A fifth adder $\Sigma 5$ adds a commanded offset value to the average video amplitude to create a threshold, which is outputted on a line 67 to the "B" input of a comparator C1 to test new video samples VRH entering the sample set, which are supplied to the "A" input of the comparator C1. Video samples in VRH which exceed the "B" input threshold could be clutter spikes or targets.

The output 69 of the comparator C1 is sent as a video flag bit to the register VR1 of FIG. 1, where it is stored in a flag bit position and clocked down the pipeline of video registers VR(n) along with the corresponding video samples.

The programmable read only memory PROM1 shown in FIG. 4 functions much like the adders $\Sigma 1$, $\Sigma 2$ and $\Sigma 3$ to determine the net sum of flags entering and exiting the sliding window. To this end PROM1 receives as inputs the video flag bits of registers VRN, VR N/2, VRT and the high video flag output of the comparator C1 on line 69. The PROM1 output 71 is supplied to an accumulator 73, comprising an adder $\Sigma 6$ and a register R2. The accumulator 73 keeps a running count of the total number of video samples in the sample set which have the high video flag set.

A second PROM, PROM2, is a lock-up table which receives the output $N_c$ of the second accumulator 73 and outputs a "Rank $\Delta$" value based on the number of high amplitude samples in the sample set. Rank $\Delta$ is then added to the rank commanded by the system controller by a seventh adder $\Sigma 7$. The seventh adder $\Sigma 7$ outputs the adjusted rank number which forms the X input to the adder $\Sigma T$ in FIG. 2 and will determine the basis for the detection threshold. As the second PROM, PROM2, adjusts the rank number, it makes a corresponding change to the Commanded Detection Threshold Offset. This adjustment is made by adder $\Sigma 8$ in the same way the detect rank was adjusted.

The adder $\Sigma 9$ in FIG. 4 determines the signal-to-selected video ratio by subtracting the log of the rank-selected video from the log of the video being tested for a threshold crossing. A comparator C2 tests the signal-to-selected video ratio against the Detect Threshold to determine the presence of a target threshold crossing. The comparator C2 outputs a flag which may be used to alert a radar post processor that the video in register VRT is a target candidate and requires further processing.

To summarize briefly, the circuit shown in FIG. 1 effectively selects any ranked element from a set of numbers. It accomplishes this on a single clock with a new number entering the sample set each clock. The circuit of FIG. 1 is particularly useful in a radar target detector; however, the circuit may also be applied to other systems which require the high speed real time ranking of a set of numbers. The circuit of FIG. 4 is one example of a circuit which can cooperate with the circuit of FIG. 1 in an OS CFAR radar.

Accordingly, those skilled in the art will appreciate that many modifications and adaptations of the disclosed circuitry may be made without departing from the scope and spirit of the invention. Therefore, it is to be understood that, within the scope of the appended claims, the invention may be practiced other than as specifically described herein.

I claim:

1. A number ranking circuit for receiving a series of samples and ranking a selected set of said samples by magnitude, comprising:

a plurality of sample register means for receiving said series of samples and for sequentially storing and shifting a selected set of said samples to be ranked such that new samples of said series are sequentially received and stored by said plurality of sample register means containing one of the samples in said set;

means for comparing the magnitude of each sample other than a last received sample in said set to the magnitude of the last received sample and producing a series of outputs;

means for summing said series of outputs to determine the initial rank of said last received sample;

rank register means for storing said initial rank and subsequent ranks assigned to each sample in said set;

means for adjusting the rank assigned to each sample in said rank register means in response to each new sample received by said plurality of sample register means; and means for determining which of said plurality of sample register means contains a sample of a selected rank.

2. The number ranking circuit of claim 1 wherein said determining means further includes means for outputting said sample of said selected rank.

3. The number ranking circuit of claim 1 wherein one of said samples comprises a target sample and wherein said determining means further includes means for effectively removing said target sample from said set of samples during the determination of which of said plurality of said sample register means contains the sample having said selected rank.

4. The number ranking circuit of claim 3 wherein said rank register means includes a plurality of rank registers forming a pipeline arrangement, said plurality of rank registers including a first rank register having an input for receiving said initial rank for said last received sample and an output, and a plurality of subsequent rank registers, each subsequent rank register having an input for receiving an input rank from the preceding one of said subsequent rank registers and an output for outputting and adjusted rank, and wherein said adjusting means comprises a plurality of increment/decrement circuit means, each of said plurality of increment/decrement means being coupled between two of said rank registers for receiving the rank outputted by one said rank registers for incrementing, decrementing, or not changing the outputted rank prior to supplying said incremented, decremented or not changed rank to said the other of said two of said rank registers.

5. The number ranking circuit of claim 4 wherein said means for determining comprises:

first rank detect register means having an input for receiving a rank to be detected and for storing said rank to be detected;

means for supplying said rank to be detected to the input of said first rank detect register means; and first comparator means for comparing the rank in each of said rank register means to the rank to be detected stored in said first rank detect register means and producing an output.

6. The number ranking circuit of claim 5 wherein said determining means further includes means for outputting sample of said selected rank.

7. The number ranking circuit of claim 5 wherein said means for effectively removing a target sample comprises:

second rank detect register means for storing said rank to be detected;

means for supplying said rank to be detected to said second rank detect register means prior to reception of said rank to be detected by said first rank: register means;

second comparator means for comparing the rank outputted by the increment/decrement circuit means adjacent the rank register containing the rank of said target sample to the rank to be detected supplied to said second rank detect register means and for generating an output signal if the rank of said target sample is greater than the rank to be detected; and wherein said means for supplying said rank to be detected to said first rank detect register means comprises first adder means responsive to said output signal for incrementing the rank to be detected prior to supply of sa to the detected to said first rank detect register means.

8. The number ranking circuit of claim 7 wherein said adjusting means further includes a plurality of third comparator means, each supplying first and second inputs to a respective said increment/decrement circuit means, each third comparator means having first and second inputs, the first inputs being connected to receive the output of a selected one of said rank registers, each second input being connected to receive an output of a respective rank register other than said selected one of said rank registers.

9. The number ranking circuit of claim 8 wherein each of said plurality of sample register means has an output and wherein said means for comparing comprises a plurality of fourth comparator means, each supplying an output to a respective one of said increment/decrement circuit means and having first and second inputs, the first input of each fourth comparator means being connected to the output of the sample register means storing the first sample in said set and the second input being connected to an output of a selected one of the sample register means other than the first.

10. The number ranking circuit of claim 9 wherein each said increment/decrement circuit means comprises:

logic means receiving the first and second outputs of one of said third comparator means and the output of one of said fourth comparator means and providing first, second and third outputs; and second adder means receiving said first, second and third outputs and the output rank value of one of said rank registers for incrementing, decrementing or not changing said output rank value.

11. The number ranking circuit of claim 1 wherein said determining means is supplied with a selected rank and further including means for adjusting said selected rank in response to the number of samples in said set which exceed an average magnitude of all the samples in said set by a predetermined amount.

12. The number ranking circuit of claim 11 wherein said means for adjusting said selected rank value includes:

means for calculating an arithmetic average of the magnitude of all of the samples in said plurality of sample register means;

means for setting a threshold in response to said average magnitude; and means for determining the number of samples which exceed said threshold.

13. The number ranking circuit of claim 12 wherein said means for adjusting further includes:

means for adjusting said selected rank value in response to the number of samples which exceed said threshold.

14. The number ranking circuit of claim 13 wherein said means for calculating an arithmetic average comprises:

adder means for adding the magnitudes of a plurality of said samples together;

an accumulator means receiving the output of said adder means and outputting an accumulated output; and means for dividing said accumulated output by the number of samples to producing a divider output.

15. The number ranking circuit of claim 14 wherein said means for setting a threshold comprises:

means for adding a threshold offset factor to the output of said divider means and producing threshold output.

16. The number ranking circuit of claim 15 wherein said means for determining comprises:

comparator means for comparing the magnitude of each incoming sample to the output of said means for adding a threshold offset factor and producing a comparator output each time the magnitude of an incoming sample exceeds said threshold; and means responsive to the output of said comparator means for producing a signal indicative of the number of samples whose magnitude exceeds said threshold.

17. The number ranking circuit of claim 16 wherein said means for producing comprises a programmable read only memory means.

18. The number ranking circuit of claim 16 wherein said means for adjusting comprises:

second accumulator means for accumulating the output of said means for producing; and means responsive to the output of said accumulator means for adjusting said selected rank value.

19. A method of ranking a series of samples by magnitude, comprising the steps of:

sequentially introducing said series of samples into a set of storage locations and sequentially shifting said series of samples through said set of storage locations;

comparing the magnitude of each sample other than the last received sample in said set to the magnitude of the last received sample and producing a series of outputs;

summing said series of outputs to determine the initial rank of said first sample;

assigning a rank to each other sample in said set by adjusting said initial rank;

storing said initial rank and the rank assigned to each other sample;

adjusting the stored rank of each sample in said set in response to each new sample entered into said set of storage locations; and determining which of said storage locations contains a sample of a selected rank.

20. The ranking method of claim 19 further including the step of outputting said sample of said selected rank.

21. The ranking method of claim 19 wherein one of said samples in one of said storage locations comprises a target sample, and further including the step of effectively removing said target sample from said set of samples during the determination of which of said set of storage locations contains the sample having said selected rank.

22. The ranking method of claim 19 further including the step of adjusting said selected rank in response to the number of samples in said set which exceeds the average magnitude of all the samples in said set by a predetermined amount.

* * * * *